United States Patent [19]

Gasowski et al.

[11] Patent Number: 4,635,696
[45] Date of Patent: Jan. 13, 1987

[54] RADIAL TIRES AND A BELT STRUCTURE THEREFOR

[75] Inventors: Chester J. Gasowski, Uniontown; Ronald L. Loeffler, Akron, both of Ohio; Joseph T. Musteric, Cumberland, Md.; Richard H. Springford; Robert L. Toth, Jr., both of Stow, Ohio

[73] Assignee: The Goodyear Tire & Rubber Company, Akron, Ohio

[21] Appl. No.: 690,910

[22] Filed: Jan. 14, 1985

Related U.S. Application Data

[63] Continuation-in-part of Ser. No. 601,134, Apr. 19, 1984, abandoned, which is a continuation of Ser. No. 434,797, Oct. 18, 1982, abandoned.

[51] Int. Cl.$^4$ .......................... B60C 9/20; B60C 9/26
[52] U.S. Cl. ..................... 152/528; 152/531; 152/536
[58] Field of Search ............ 152/361 R, 361 FP, 358, 152/526, 527, 528–529, 531, 536

[56] References Cited

U.S. PATENT DOCUMENTS

| 2,688,996 | 9/1954 | Loomis | 156/134 |
|---|---|---|---|
| 2,754,887 | 7/1956 | Wykoff | 156/134 |
| 3,386,487 | 6/1968 | Massoubre | 152/361 R |
| 3,598,165 | 8/1971 | Hanus | 152/361 R |
| 4,034,791 | 7/1977 | Mirtain | 152/361 FP |
| 4,062,393 | 12/1977 | Bertrand | 152/361 R |
| 4,184,530 | 1/1980 | Mirtain | 152/361 FP |
| 4,196,764 | 4/1980 | Skidmore | 152/361 R |
| 4,273,177 | 6/1981 | Nybakken | 152/360 |
| 4,498,514 | 2/1985 | Maathuis et al. | 152/361 DM |

FOREIGN PATENT DOCUMENTS

| 21157 | 1/1977 | Australia . | |
|---|---|---|---|
| 24571 | 4/1977 | Australia . | |
| 1035682 | 6/1978 | Canada . | |
| 1680346 | 10/1971 | Fed. Rep. of Germany . | |
| 1258886 | 3/1961 | France . | |
| 1299622 | 6/1962 | France . | |
| 1416538 | 9/1965 | France . | |
| 1586370 | 1/1970 | France . | |
| 24803 | of 1899 | United Kingdom . | |
| 1262105 | 2/1972 | United Kingdom . | |
| 2021051 | 11/1979 | United Kingdom | 152/361 FP |
| 2038248 | 7/1980 | United Kingdom . | |
| 1575027 | 9/1980 | United Kingdom . | |
| 1590013 | 5/1981 | United Kingdom . | |
| 2126502 | 3/1984 | United Kingdom . | |

*Primary Examiner*—Lois E. Boland
*Attorney, Agent, or Firm*—L. R. Drayer

[57] ABSTRACT

A radial ply tire has a belt structure with a pair of edge strips of square woven fabric. A portion of each edge strip is disposed between a pair of belt plies that are adjacent to one another, and the edge strips may be folded around the respective axial edges of the radially innermost belt ply.

6 Claims, 3 Drawing Figures

RADIAL TIRES AND A BELT STRUCTURE THEREFOR

This is a continuation in part of application Ser. No. 601,134 filed Apr. 19, 1984, now abandoned, which was a continuation of application Ser. No. 434,797 filed Oct. 18, 1982, now abandoned.

BACKGROUND OF THE INVENTION

The invention relates to a belt structure for a pneumatic tire, and more particularly to a belt structure having belt edge strips that are reinforced with square woven fabric.

As used in this disclosure and the appended claims with reference to a tire, the term "circumferential" should be understood as referring to the directions around the circumference of the tire. The terms "axial" and "axially" should be understood as referring to the directions parallel to the axis of rotation of the tire and perpendicular to the mid-circumferential plane of the tire. The "mid-circumferential plane" of the tire should be understood as referring to a plane perpendicular to the axis of rotation of the tire located midway between the sidewalls of the tire. The terms "radial" and "radially" should be understood as referring to the directions toward or away from the axis of rotation of the tire.

Reinforcing belt structures in tires are sometimes subject to a phenomenon known as "belt edge separation". Belt edge separation occurs when the axial edges of the belt plies become displaced from their preferred positions during operation of the tire and thus become separated from the underlying carcass-reinforcing ply, an adjacent belt ply, or overlying tread material. Various solutions have been suggested to eliminate belt edge separation. For example, U.S. Pat. No. 4,184,530 teaches the use of cap plies or strips having cords from a synthetic material having a low modulus of elongation overlapping an edge region of a belt ply, with the cords extending in a circumferential direction only: U.S. Pat. No. 3,598,165 teaches an elastomeric strip surrounding the belt edges with a fabric overlay on top of the strip; U.S. Pat. No. 4,062,393 teaches a body of rubber having a Shore A hardness of between 70 and 80 positioned to cover the belt edges: and Canadian Pat. No. 1,035,682 teaches the use of uncalendered square woven fabric as belt edge strips.

There is provided in accordance with one aspect of the present invention a radial tire comprising a tread portion and an annular belt structure underlying said tread portion, said annular belt structure comprising a plurality of radially superposed belt plies and a pair of axially spaced apart edge strips of leno weave fabric, a portion of each edge strip being disposed between a pair of belt plies that are adjacent to one another.

These and other features of the present invention can be better understood from the following detailed description of the preferred embodiments, when read in conjunction with the accompanying drawings.

DETAILED DESCRIPTION OF THE INVENTION

Figure 1:
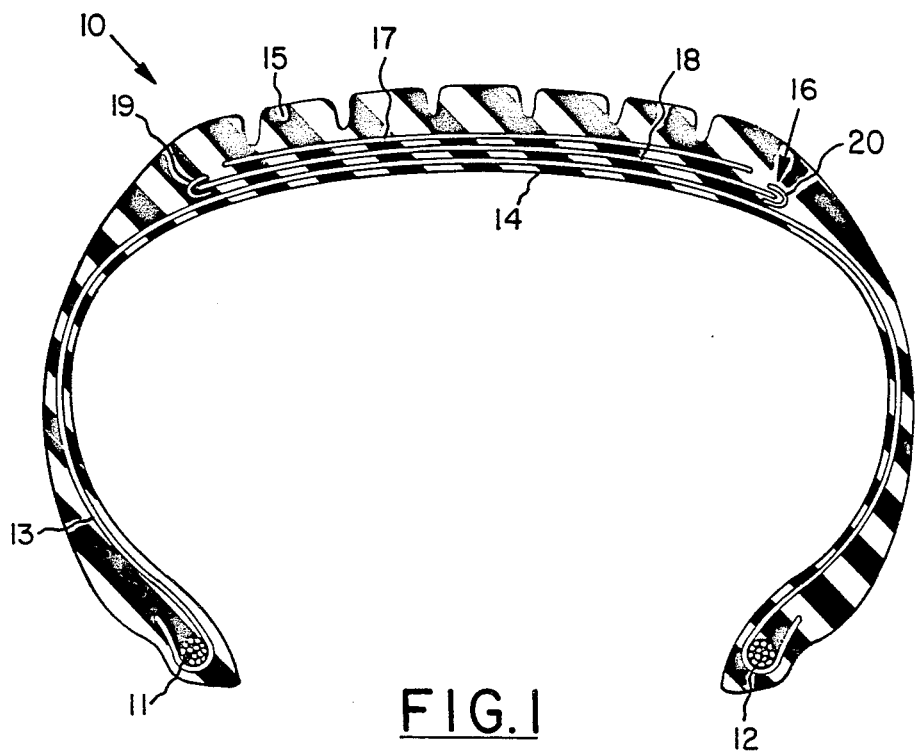
FIG. 1 is a radial cross-sectional view of a tire having a belt structure according to the preferred embodiment of the invention.

Referring first to FIG. 1, there is shown a radial cross-sectional view of a radial tire 10 manufactured in accordance with the preferred embodiment of the invention. The term "radial tire" should be understood as referring to a tire in which the reinforcing cords of the carcass-reinforcing ply are oriented at an angle of between about 75 to about 90 degrees with respect to the mid-circumferential plane of the tire. The radial tire 10 shown in FIG. 1 has an annular carcass including a pair of annular beads 11,12 and a carcass-reinforcing ply 13 extending from one bead to the other. The carcass has a radially outerlying crown portion 14. A tread portion 15 extends circumferentially about the crown portion 14 of the carcass.

An annular belt structure 16, underlies the tread portion of the radial tire, and is disposed between the tread portion 15 and the crown portion 14 of the carcass. It is desirable that the crown portion of a tire carcass should have substantial rigidity or resistance to deformation in the circumferential and axial directions to improve the tread wear and handling characteristics of the tire. Because the reinforcing cords of the carcass-reinforcing ply of a radial tire do not substantially reinforce the crown region in a circumferential direction, radial tires are provided with belt plies. The annular belt structure is comprised of a plurality of radially superposed belt plies 17,18 of parallel reinforcing cords, such as steel, glass, or any other suitable material, embedded in an elastomeric substance, such as natural or synthetic rubber. As used herein, "plurality" means more than one. The reinforcing cords of the belt plies are oriented at a much lower angle, for example, between about 15 to about 35 degrees, with respect to the mid-circumferential plane of the tire than the reinforcing cords of the carcass-reinforcing ply. It is believed that the relative axial width of the belt plies will have no effect upon the practicing of the invention; in other words, it does not matter whether the belt plies all have the same axial width or different axial widths. The annular belt structure 16 is further comprised of a pair of axially spaced apart edge strips 19,20 of square woven fabric with only a portion, preferably substantially one-half of the unfolded axial width, of each edge strip being disposed between a pair of belt plies that are adjacent to one another. Depending upon the size of the tire, the edge strips preferably have unfolded axial widths of between about 15 to about 40 percent of the axial width of the widest belt ply of the annular belt structure.

The edge strips 19,20 are comprised of what is commonly referred to in the tire technology as square woven fabric. As used herein, and in the appended claims, "square woven fabric" refers to a plurality of textile cords that are interwoven or knit such that a first portion of the textile cords extend parallel to one another in a first direction while the remainder of the textile cords extend parallel to one another in a second direction that is substantially perpendicular to the first direction. As used herein, and in the appended claims, "interwoven" refers to fabric produced by interlacing two cords so that they cross each other at right angles, and "knit" refers to fabric produced by interlocking a series of loops of one or more cords. As used herein, and in the appended claims, "textile cords" refers to any fiber, filament or yarn of the type used for reinforcing tires. The textile cords of the square woven fabric used in practicing this invention are preferably nylon, (either type 6 or type 66), but may be polyester or any other suitable material selected in accordance with good engineering practice.

Figure 3:
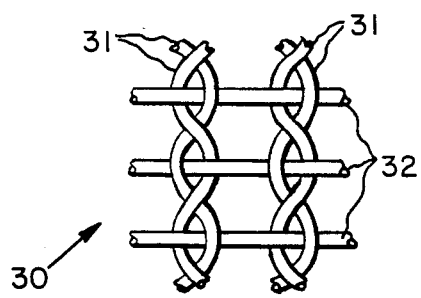
FIG. 3 is a plan view of a sample of leno weave fabric.

In the preferred embodiment of the invention the edge strips comprise a special type of square woven fabric that is known as leno weave. FIG. 3 is a plan view of a sample 30 of leno weave fabric. Leno weave is an open-effect weave in which every other yarn of the warp 31 is crossed wholly or partially with its companion yarn. The warp yarns therefore work in pairs. The warp yarns 31 cross each other between the weft yarns 32 in the actual weaving of the material. This structure affords good strength to the fabric and reduces the probability of yarn slippage or distortion because the warp yarns are twisted around the weft yarns.

The square woven fabric of the edge strips is preferably embedded in a sheet of an elastomeric substance by calendering, in a manner that is well known in the art, before cutting the material into strips of the desired size. It is preferable that the warp cords of the square woven fabric extend in a first direction that is substantially parallel to the respective axial edge of the belt plies, or in other words, in a direction that is substantially parallel to the mid-circumferential plane of the tire. Therefore, it is preferable that the textile cords of the square woven fabric in the edge strips extend in circumferential and axial directions rather than being oriented at various oblique angles with respect to the mid-circumferential plane of the tire. As used herein, the "mid-circumferential plane" of a tire is a plane that is perpendicular to the tire's axis of rotation and located midway between its sidewalls.

It is believed that a radial tire manufactured in accordance with this invention performs better on durability tests than prior art radial tires with respect to problems associated with belt edge separation such as fast shoulder wear and vibration disturbances. By "durability" is meant the useful life of a tire. The edge strips used in belt structures of radial tires made in accordance with this invention are believed to contribute to improved durability by keeping the edges of the belts at the diameter they have when the tire is newly vulcanized, adding stiffness to the belt edge regions, and preventing damage from being caused by the ends of steel cords at the cut edges of the belt plies.

It has been found that the edge strips may be satisfactorily manufactured using leno woven nylon 66 multifilament with an overall fabric gauge of 0.011 inches (0.28 mm.) having 36 warp cords (that is to say 18 pairs of warp cords) per inch (14.17 cords per cm.) in a first direction and 18 weft cords per inch (7.09 cords per cm.) in a second direction that is perpendicular to the first direction. In other words, substantially two-thirds of the total number of nylon cords, regardless of length or volume, in each edge strip extend in the first direction, while only one-third extend in the second direction. It is preferable that if the edge strips have more cords per unit of length in one direction than another, that the direction in which the cords per unit of length is higher should extend in the circumferential direction with respect to the tire, or in other words, substantially parallel to the mid-circumferential plane.

The radial tire 10 of FIG. 1 illustrates an embodiment of the invention wherein the annular belt structure 16 is comprised of only two belt plies, and each edge strip 19,20 is folded around a respective axial edge of the radially innermost belt ply 18. The invention may be practiced with annular belt structures comprising more than two belt plies (not shown) by having the pair of belt plies that the edge strips are disposed between being the two radially innermost belt plies of the annular belt structure. Each edge strip is then folded around a respective axial edge of the radially innermost belt ply of the pair of belt plies.

Figure 2:
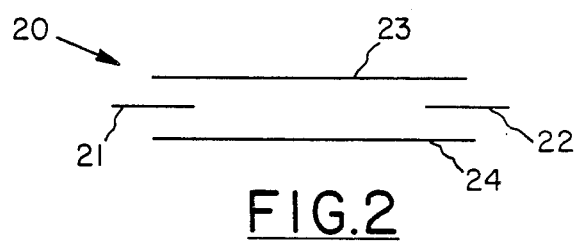
FIG. 2 is a cross-sectional view of a belt structure according to another embodiment of the invention.

FIG. 2 is a cross-sectional view of a belt structure 20 made in accordance with another aspect of the invention wherein the portions of the edge strips 21,22 that are not disposed between the belt plies 23,24 that are adjacent to one another are not folded around the respective axial edges of a belt ply, but instead extend unfolded axially outwardly of the respective axial edges of the annular belt structure 20. In all other respects, the annular belt structure 20 is substantially the same as the annular belt structure illustrated in FIG. 1, and could be used in the radial tire shown in FIG. 1.

A trial has been run comparing edge strips of an elastomer without any fabric reinforcement to both calendered and uncalendered edge strips of leno weave and simple interwoven fabric. Two tires of each construction were manufactured with the edge strips arranged as illustrated in FIG. 1. With the exception of the edge strips, the tires were substantially the same. The tires were mounted on wheels and run against a test wheel at a speed of 50 mph, at a set range of angles to simulate yaw on a vehicle.

| Edge Strip Structure | Tire No. | Total No. of Test Miles | Final Holography Rating | Comments |
|---|---|---|---|---|
| Rubber only with no fabric | 1 | 4,100 | S1 | Tire Failure |
|  | 2 | 8,105 | S4 | Tire Failure |
| Leno weave fabric calendered with rubber before assembly in tire; nylon type 66 multifilament warp and weft; warp 18 double yarns per inch, denier 210 for each individual warp yarn; weft 18 single yarns per inch denier 210; overall fabric ga .011 inches | 3 | 8,060 | L3 | No Tire Failure |
|  | 4 | 8,106 | S.5 | No Tire Failure |
| Same as for tires 3 and 4 except that fabric was not calendered before assembly into tire | 5 | 6,851 | S1 | Tire Failure |
|  | 6 | 5,642 | S1 | Tire Failure |
| Interwoven fabric calendered with rubber before assembly into tire; nylon type 66 warp and weft; warp and weft both 19 yarns per inch with 840 denier; overall | 7 | 8,060 | S.5 | No Tire Failure |
|  | 8 | 8,106 | S.5 | No Tire Failure |

| Edge Strip Structure | Tire No. | Total No. of Test Miles | Final Holography Rating | Comments |
|---|---|---|---|---|
| fabric gauge of .023 inches | | | | |
| Same as tires 7 and 8 except that fabric was not calendered before assembly with tires | 9 | 8,060 | S3 | No Tire Failure |
| | 10 | 8,105 | S1 | No Tire Failure |

At approximately 1,000 mile intervals the tires were removed from the test and subjected to holographic inspection. Holographic ratings range from L1 (best) to L5 and then S.5 to S10 (worst) on a continuum. The test results are summarized in the following table.

It is clear from the test results that edge strips reinforced with square woven fabric are better for tire durability than edge strips that are not reinforced with fabric. It is further clear that for a given variety of square woven fabric better tire durability is achieved if the fabric of the edge strips is coated with rubber prior to its assembly into the tire.

While certain representative details and embodiments have been shown for the purpose of illustrating the invention, it will be apparent to those skilled in the art that various changes and modifications may be made therein without departing from the spirit or scope of the invention.

What is claimed is:

1. A radial tire comprising a tread portion and an annular belt structure underlying said tread portion, said annular belt structure comprising a pair of radially superposed belt plies and a pair of axially spaced apart edge strips, said edges strips comprising square woven fabric that was embedded in an elastomeric substance prior to the assembly of said edge strips with said belt plies to manufacture said annular belt structure, the square woven fabric of said edge strips having cords extending in a circumferential direction of said tire and cords extending transverse to said circumferential direction, each said edge strip being folded around a respective axial edge of only the radially innermost of said belt plies.

2. A radial tire according to claim 1 wherein said square woven fabric is leno weave, and said leno weave has warp cords that are oriented in a circumferential direction of the tire.

3. A radial tire according to claim 1 wherein said square woven fabric is knit.

4. A radial tire according to claim 1 wherein said square woven fabric comprises cords that are interwoven.

5. A radial tire comprising a tread portion and an annular belt structure underlying said tread portion, said annular belt structure comprising a pair of radially superposed belt plies and a pair of axially spaced apart edge strips, said edge strips comprising square woven leno weave fabric that was embedded in an elastomeric substance prior to the assembly of said edge strips with said belt plies to manufacture said annular belt structure, only a portion of each edge strip being disposed between the radially innermost of said belt plies and the next adjacent belt ply, the square woven leno weave fabric of said edge strips having warp cords extending in a circumferential direction of said tire and other cords extending transverse to said circumferential direction.

6. A radial tire comprising a tread portion and an annular belt structure underlying said tread portion, said annular belt structure comprising a pair of radially superposed belt plies and a pair of axially spaced apart edge strips, said edge strips comprising knit fabric that was embedded in an elastomeric substance prior to the assembly of said edge strips with said belt plies to manufacture said annular belt structure, only a portion of each edge strip being disposed between the radially innermost of said belt plies and the next adjacent belt ply, the knit fabric of said edge strips having cords extending in a circumferential direction of said tire and cords extending transverse to said circumferential direction.

* * * * *